United States Patent Office 3,651,038
Patented Mar. 21, 1972

3,651,038
PROCESS FOR PREPARING HIGH-SOLIDS CHLOROPRENE POLYMER LATEX
Austin Matthew Snow, Jr., Wilmington, Del., assignor to E. I. du Pont de Nemours and Company, Wilmington, Del.
No Drawing. Continuation-in-part of application Ser. No. 669,720, Sept. 22, 1967. This application Sept. 30, 1969, Ser. No. 862,449
Int. Cl. C08f 3/16
U.S. Cl. 260—92.3          4 Claims

ABSTRACT OF THE DISCLOSURE

High-solids chloroprene polymer latexes are prepared by polymerizing chloroprene in an alkaline aqueous emulsion containing critical amounts of the potassium salts or a mixture of sodium and potassium salts of (1) wood rosin acid, (2) a formaldehyde condensate of a naphthalenesulfonic acid, and (3) a polymerized unsaturated fatty acid.

CROSS-REFERENCE TO RELATED APPLICATION

This application is a continuation-in-part of my copending application Ser. No. 669,720 filed Sept. 22, 1967 now abandoned.

BACKGROUND OF THE INVENTION

For many purposes it is desirable to use a chloroprene polymer latex containing a relatively high content of polymer. Such latexes are usually referred to as "high-solids" latexes. The most practical method heretofore used for the preparation of high-solids chloroprene polymer latexes has been a multiple-step procedure wherein a polychloroprene latex is first prepared and then is concentrated by a "creaming" step, by addition to the latex of a 1% solution of ammonium alginate containing about 3% lauryl acid sulfate, or by the procedure disclosed in U.S. Pat. 2,405,724. This indirect method of preparation has several disadvantages and is usually accompanied by some loss of polymer. A direct polymerization method would avoid the need for a separate operation and have certain other advantages over the creaming procedure, such as producing latexes having lower viscosity and greater colloidal stability.

Unfortunately, most direct methods that have been proposed heretofore for the preparation of high-solids chloroprene polymer latex are not practical for large-scale operations. When water content or soap content of the polymerization system is decreased, severe problems are encountered, such as excessive viscosity or colloidal instability, or both, of the reaction mass or the resulting latex. Furthermore, the problems are complicated by the need to consider possible adverse effects of changes of the polymerization recipe on the final properties of consumer goods prepared from the latexes.

SUMMARY

Now according to the present invention it has been found that the foregoing and related problems of the prior art can be overcome and high-solids chloroprene polymer latexes can be produced by directly polymerizing chloroprene in an alkaline aqueous emulsion containing 60 to 100 parts of water if there is present in the emulsion a combination of the potassium or mixed sodium and potassium salts of:

(a) About 1.5 parts of wood rosin,
(b) About 1.5 to 2 parts of a formaldehyde condensate of a naphthalenesulfonic acid (parts based on the salt), and
(c) About 0.3 part of polymerized unsaturated fatty acid, all parts being by weight per 100 parts of monomer.

DESCRIPTION OF THE PREFERRED EMBODIMENTS

The solids content of latexes prepared by processes of this invention varies slightly with the conversion of the monomer but depends primarily on the amount of water used and usually will range from 50% to 65%. "Solids" refers to the total solids of the latex. A method of determining solids content is illustrated in the examples.

The properties of the final chloroprene polymer may be altered by polymerizing in the presence of one or more of the well-known "modifying agents" such as sulfur, alkyl mercaptans, iodoform, and dialkyl xanthogen disulfides.

The polymerization is carried out using well-known emulsion polymerization techniques. To prepare a latex having a high content of polymer, the amount of water used is about 60 to 100 parts by weight per 100 parts of monomer. Conventional polymerization initiators of the free-radical type are used. These include compounds containing the peroxy radical, such as hydrogen peroxide, cumene hydroperoxide, and water soluble salts of persulfuric acid. The polymerization can be carried out between 35° C. and 60° C., preferably between 40 and 55° C. The pH should be at least about 10.5 and, preferably is about 13. The percent monomer conversion is 95 to 100%. If desired, volatile components may be removed after polymerization, for example as described in U.S. Pat. 2,467,769.

The wood rosins used are the wood rosins of commerce, preferably N grade or Nancy wood rosin.

The polymerized unsaturated fatty acids are also commercially available materials. They are derived from acyclic, aliphatic polyunsaturated carboxylic acids, preferably containing 16 to 18 carbon atoms. Of these, linoleic acid is the best-known example. The commercially available materials usually are mixtures of dimeric and trimeric materials containing a small amount of the monomer. A discussion of polymerized unsaturated fatty acids is found in column 2 of U.S. Pat. 2,876,203.

The condensation products of formaldehyde and a naphthalenesulfonic acid are likewise well-known materials. The naphthalene ring may be substituted with one or more lower alkyl groups. Such compounds are disclosed, for example, in U.S. Pat. 1,336,759. A discussion of compounds of this type appears also in Schwartz and Perry, Surface Active Agents, 1949, p. 119.

The amounts of the three components of the emulsifying composition are critical for operation with minimum amounts of water. The most important criterion is the maximum viscosity of the latex during the polymerization. If the latex becomes too viscous, it is impossible to control the polymerization because stirring becomes difficult and there is a consequent lack of adequate heat removal. While the upper permissible value of viscosity may vary somewhat for individual commercial facilities, a practical limit is 600 centipoises, determined at the polymerization temperature. If the emulsion is not colloidally stable, polymer will coagulate. Another type of instability, sedimentation, is the development of a concentration gradient in the latex upon quiescent standing. Neither instability is desirable.

About 1.5 parts of the wood rosin per 100 parts of monomer must be used to give, upon neutralization, a soap forming sufficient micelles for the polymerization to proceed. If appreciably more than 1.5 parts of the rosin is used, the maximum viscosity during polymerization will become too high for the process to be practical, unless excessive amounts of naphthalenesulfonic acid-formaldehyde condensation product are added.

From 1.5 to two parts of the salt of naphthalene-sulfonic acid-formaldehyde condensate is required to provide adequate colloidal stability, particularly with respect to avoiding formation of coagulum during the polymerization process, and to keep the viscosity of the polymerizing emulsion within acceptable limits.

About 0.30 part of the polymerized fatty acid is used to provide a latex having adequate colloidal stability. More than 0.3 part leads to excessive polymerization viscosity unless an excessive amount of naphthalene sulfonic-formaldehyde condensation product is added. The potassium salts are preferred since their use ensures good emulsion stability and minimum peak viscosity during polymerization. However, as much as 50% of the potassium ion may be replaced by sodium ion with satisfactory results, but amounts that cause precipitation of polymerized fatty acid should be avoided.

To keep viscosity within acceptable limits when the amount of water is a minimum the use of small amounts of dextrose and potassium sulfite may be added to the recipe. The addition of small amounts of potassium tripolyphosphate also tends to reduce viscosity. However this is not essential.

To ensure maximum stability during aging, additional emulsifying agents and pH regulators, such as rosin salt, additional polymerized fatty acid salt, and diethanolamine may be added to the latex after polymerization. This is not essential.

The latexes prepared in accordance with this invention are highly useful materials. Representative uses are for saturation of cellulosic materials, and for the preparation of dipped goods nad latex foam articles.

EXAMPLES

The invention will be better understood by reference to the following illustrative examples.

In the examples, chloroprene is polymerized in an aqueous emulsion under a nitrogen atmosphere. Polymerization is allowed to proceed to completion. During the polymerization, Brookfield viscosities of samples are measured at polymerization temperature using a No. 2 spindle at 60 r.p.m.

The amount of coagulum present is determined by straining the latex through a double thickness of cheesecloth. As much water as possible is pressed out manually and the wet sample is weighed. Percent coagulum is based on the weight of the monomer charged.

The solids content of the latex is calculated by evaporating off water and other volatile materials from a weighed sample at 100° C. The residue is weighed and percent solids is based on the weight of the original latex sample.

All parts are by weight unless otherwise stated.

EXAMPLE 1

A latex is prepared using the following recipe:

| | Parts |
|---|---|
| Chloroprene | 100 |
| Sulfur | 0.01 |
| Iodoform | 0.1 |
| Wood rosin [c] | 1.5 |
| Dimerized linoleic acid [a] | 0.3 |
| Potassium salt of condensate of formaldehyde and alkylnaphthalene-sulfonic acid [b] | 1.5 |
| Water | 60 |
| Potassium hydroxide | 1.1 |

[a] Essentially a $C_{36}$ dibasic acid resulting from the polymerization of linoleic acid. The dimer content is about 75%, the trimer content is about 22%, and the monomer content is about 3%. It is commercially available as "Empol 1022" from Emery Industries, Inc.
[b] The material used is "Daxad 11 KLS" supplied by W. R. Grace and Co. It is the potassium salt of the condensate of formaldehyde and alkylnaphthalenesulfonic acid; it is stable in the presence of mild acids and alkalies; it has practically no tendency to foam and it has a pH (1% Sol. at 72° F.) of 7 to 8.5. Parts are based on the active ingredient.
[c] The material used is N grade wood rosin supplied by Heyden-Newport Chem. Industries, Division of Tenneco.

The catalyst solution is an aqueous solution containing 5% potassium persulfate and 0.125% sodium 2-anthraquinonesulfonate. Polymerization is carried out at 45° C. After polymerization the following solution is added:

| | |
|---|---|
| Potassium salt of wood rosin [d] | 2.5 |
| Diethanolamine | 1.0 |
| Water | 2.3 |

[d] The material used is "Dresinate" 91, the potassium salt of processed wood resin sold by Hercules, Inc.

The peak viscosity observed during the polymerization and the solids contents of the final latex is:

| | |
|---|---|
| Viscosity, cps. | 126 |
| Solids, percent | 59.7 |

No coagulum is observed.

EXAMPLE 2

The procedure is the same as for Example 1 except that 0.1 part of potassium tripolyphosphate is dissolved in the water before emulsifying and polymerizing.

| | |
|---|---|
| Peak viscosity, cps. | 192 |
| Solids, percent | 59.5 |

No coagulum is observed, nor any sedimentation after 9 days.

EXAMPLE 3

The procedure is the same as for Example 1 except that 2.0 parts of the potassium salt of condensate of formaldehyde and alkyl naphthalene sulfonic acid is used.

| | |
|---|---|
| Peak viscosity, cps. | 100 |
| Solids, percent | 59.7 |

No coagulum is observed, nor any sedimentation after standing quiescent for 84 days.

I claim:
1. In a process for directly polymerizing chloroprene to at least 50% solids in an alkaline aqueous emulsion containing 60 to 100 parts of water, the improvement which comprises polymerizing said chloroprene while having present in the emulsion a combination of the potassium or mixed sodium and potassium salts of:
  (a) About 1.5 parts of a wood rosin,
  (b) From 1.5 to 2 parts of a formaldehyde condensate of a naphthalene sulfonic acid (parts based on the salt), and
  (c) About 0.3 part of polymerized unsaturated fatty acid,
all parts being by weight per 100 parts of monomer.

2. A process of claim 1 wherein the salts present in the emulsion are potassium salts.

3. A process of claim 1 wherein the wood rosin is "N" grade wood rosin.

4. A process of claim 1 wherein the wood rosin is Nancy wood rosin.

References Cited

UNITED STATES PATENTS

| | | | |
|---|---|---|---|
| 3,190,865 | 6/1965 | Miller | 260—92.3 |
| 3,317,451 | 5/1967 | Apotheker | 260—29.7 |
| 3,392,134 | 7/1968 | Apotheker | 260—29.7 |
| 3,472,828 | 10/1969 | Montgomery | 260—92.3 |
| 3,498,935 | 3/1970 | Noble | 260—2.5 |

JOSEPH L. SCHOFER, Primary Examiner

C. A. HENDERSON, Jr., Assistant Examiner

U.S. Cl. X.R.

260—23.7 H, 23.7 A, 27 BB, 29.7 SO